United States Patent Office 3,780,122
Patented Dec. 18, 1973

3,780,122
ALKYLAROMATIC TRANSALKYLATION UTILIZING ALUMINA DEFICIENT MORDENITE
Ernest L. Pollitzer, Skokie, Ill., assignor to Universal Oil Products Company, Des Plaines, Ill.
No Drawing. Continuation of application Ser. No. 69,976, Sept. 4, 1970, which is a continuation-in-part of application Ser. No. 729,550, May 16, 1968, both now abandoned. This application July 10, 1972, Ser. No. 270,395
Int. Cl. C07c *3/62*
U.S. Cl. 260—672 T        14 Claims

ABSTRACT OF THE DISCLOSURE

Alkylaromatic hydrocarbons are transalkylated utilizing a mordenite type catalyst wherein the silica to alumina mole ratio of the mordenite has been increased to greater than about 10:1.

CROSS-REFERENCE TO RELATED APPLICATIONS

This application is a continuation of my co-pending application, Ser. No. 69,976, filed Sept. 4, 1970 and now abandoned, which is, in turn, a continuation-in-part of my application Ser. No. 729,550, filed May 16, 1968, and now abandoned.

BACKGROUND OF THE INVENTION

The present invention relates to a process for the transalkylation of alkylaromatic hydrocarbons. More specifically, the present invention relates to an alkylaromatic transalkylation process which utilizes a mordenite type catalyst having an increased silica to alumina mole ratio.

Mordenite is a crystalline aluminosilicate of the lamellar zeolite type having a lamellar cleavage parallel to (010) and which is well known to those trained in the art both as an adsorptive agent and as a catalytic agent in hydrocarbon conversion reactions. Mordenite, as typically manufactured or found in nature, is highly siliceous and is characterized in having a silica ($SiO_2$) to alumina ($Al_2O_3$) mole ratio of about 10:1. The crystalline structure of mordensite comprises four and five membered rings of $SiO_4$ and $AlO_4$ tetrahedra so arranged that the resulting crystal lattice comprises pores and channels running parallel along the crystal axis to give a tubular configuration. This structure is unique among the zeolitic crystalline aluminosilicates in that these channels do not intersect, and access to the cages or cavities can be gained in only one direction. For this reason, the mordenite structure is frequently described as two dimensional, as opposed to other crystalline alumino-silicates, such as faujasite, in which the cavities can be entered from three directions.

As previously stated, mordenite, as typically commercially available, has a silica to alumina mole ratio conventionally of about 10:1 and is usually initially produced in the sodium form. Before this mordenite can be utilized as an effective catalyst for most hydrocarbon conversion reactions, it must be first converted to the hydrogen form and/or the sodium metal ion (or any other alkali metal ion which may be present) must be replaced with a catalytically active metal cation. Such catalytically active metal cations are exemplified by magnesium and calcium. Crystalline aluminosilicates, including mordenite, may be converted to the hydrogen form by first ion exchanging the alkali metal ions with ammonium ions followed by thermal treatment to convert the ammonium exchanged zeolite to the hydrogen form. Mordenite, however, because of its high initial silica to alumina mole ratio, is more acid resistant than other crystalline aluminosilicates such as faujasite and thus may be converted directly to the hydrogen form by ion exchanging the sodium ion with a hydrogen ion by treatment with an aqueous solution of a mineral acid. In this ion exchange, however, the alkali metal ion is simply replaced by the hydrogen ion and the silica to alumina mole ratio of the original mordenite remains essentially within the range from about 8:1 to about 13:1 and typically about 10:1. These hydrogen ion exchanged mordenites are often termed H-mordenite and are well known to those in the art both as a general use catalytic composite and as a specific composite effective in catalyzing a disproportionation reaction between alkylaromatic hydrocarbons as illustrated U.S. Pat. 3,281,483.

The catalytic activity of the alkali metal form of mordenite for certain hydrocarbon conversion reactions, such as hydrocracking, may also be increased by actually physically extracting a portion of the alumina from the mordenite crystal structure, as well as simultaneously ion exchanging hydrogen ions for the alkali metal ions. This extraction is effected by treatment with relatively strong mineral acids such as hydrochloric or sulfuric acids under relatively severe temperatures and contact times. Produced are alumina deficient mordenites maintaining the same relative gross crystal structure, in terms of gross interatomic distances, as the original mordenite, as measured by X-ray diffraction patterns. Mordenites that have been so acid extracted typically have a silica to alumina mole ratio in excess of 25:1, after extending to 100:1 or more. These so-called alumina deficient, acid extracted mordenites are exemplified by U.S. Pat. No. 3,480,539.

It has now been discovered that mordenite catalytic compositions deficient in alumina and, more particularly, mordenites having at least a portion of the alumina removed therefrom by extraction with acids, are particularly effective catalysts for transalkylating alkylaromatic hydrocarbons. In particular, these acid extracted, alumina deficient mordenites are much more active than the typically encountered H-mordenite catalysts having a silica to alumina mole ratio of about 10:1.

SUMMARY OF THE INVENTION

In an embodiment, therefore, the process of the present invention relates to the transalkylation of an alkylaromatic hydrocarbon which comprises contacting said hydrocarbon at transalkylation conditions including a temperature of about 200° C. to about 480° C. and a pressure of about atmospheric to about 100 atmospheres with a mordenite type catalyst composition obtained by increasing the silica to alumina mole ratio of a mordenite having an initial silica to alumina mole ratio conventionally of about 10:1 to greater than 10:1. Preferably, the mordenite employed as the catalyst has a silica to alumina mole ratio greater than about 15:1, and is prepared by extracting alumina from a mordenite with a conventional initial silica to alumina mole ratio of about 10:1 accomplished preferably by treatment with an aqueous solution of an at least one normal (1 N) acid at a temperature in the range of about 0° C. to about 200° C. Preferred alkylaromatic hydrocarbons to be utilized include toluene, ethylbenzene, and the polyethylbenzenes (diethylbenzenes and triethylbenzenes in particular) and mixtures of the polyethylbenzenes and benzene.

In further, more limited embodiments, the alkylaromatic hydrocarbon is admixed with hydrogen at a hydrogen to hydrocarbon mole ratio of about 2:1 to about 20:1. The alkylaromatic may also be admixed with a halogen, particularly chloride, in an amount of about 0.001 to about 2 wt. percent of the alkylaromatic feed and preferably 0.001 to 0.5 wt. percent.

Other embodiments referring to the process of the present invention and, in particular, methods of preparing the catalyst to be utilized therein and the hydrocarbons

DESCRIPTION OF THE PREFERRED EMBODIMENTS

As previously indicated, the catalyst utilized in the process of the present invention is a mordenite type catalyst obtained by increasing the silica to alumina mole ratio of a mordenite having a conventional initial silica to alumina ratio of about 10:1 to greater than 10:1. Preferably, the silica to alumina ratio of the mordenite utilized as a catalyst in the process of the present invention is greater than about 15:1 and, more particularly, from about 15:1 to about 100:1. While the silica to alumina mole ratio of a mordenite having an initial value of about 10:1 in a broad embodiment may be increased by any means known to those trained in the art, a particularly preferred method of removing alumina from the conventional initial mordenite composition to give an increased silica to alumina ratio comprises treating the mordenite with relatively strong acids at temperatures from about 0° C. to about 200° C. Preferred acids are aqueous solutions of the mineral acids, such as hydrochloric acid, nitric acid, or sulfuric acid of at least one normal (1 N) concentration. Particularly preferred acid concentration ranges are about 1 N to about 15 N and temperatures in the range of about 75° C. to about 125° C. Contact times can vary from 1 to 24 hours and more typically from 2 to 10 hours. By varying the temperature, contact times and acid concentrations utilized in the acid extraction, the exact degree of alumina removal can be controlled. A preferred method for forming the catalyst to be used in the process of the present invention comprises treating a typical commercially available mordenite having a silica to alumina mole ratio conventionally of about 10:1, such as that available from the Norton Company, with hydrochloric acid in an amount of about 3 to 10 moles of hydrochloric acid of the concentration (normality) as described per mole of alumina present in the original mordenite. The mordenite is then contacted under reflux conditions at temperatures in the range of about 100° C. to about 110° C. for about 4 to 10 hours followed by a water wash to remove excess chloride and calcination at a temperature of about 200° C. to about 900° C. for a period of about 1 to 5 hours. Further, the mordenite which is to be treated with the acids, as hereinbefore described, need not be in the hydrogen form and may be in the alkali metal form, since under the conditions utilized to extract the alumina from the mordenite, hydrogen ions will be simultaneously exchanged for cations present in the original mordenite.

Other acids also suitable for extracting alumina from mordenite so as to produce the catalyst to be utilized in the present invention, but not necessarily with equivalent results, include hydrobromic acid, acetic acid, phosphoric acid, chloroacetic acid, citric acid, tartaric acid and the like. In any event, whatever acids, concentrations, or conditions are utilized in the extraction, such acids and conditions are to be chosen and manipulated to avoid any decomposition of the crystalline structure of the mordenite. The alumina deficient mordenite utilized herein may also be prepared or suspended in an inorganic oxide support or matrix such as alumina, silica, thoria, boria, silica-alumina and the like. However, if such inorganic oxide matrices are present, it is preferred that the crystalline, alumina deficient mordenite comprise at least 50% of the total solid catalytic composite.

The process of the present invention for the transalkylation of an alkylaromatic hydrocarbon is effected by contacting the alkylaromatic hydrocarbon with the hereinbefore described catalyst at transalkylation conditions including a temperature of about 200° C. to about 480° C. and a pressure of about atmospheric to about 100 atmospheres. In addition, substantially anhydrous conditions, including a water content in the alkylaromatic hydrocarbon of less than 25 p.p.m. (weight), are preferred to help develop and maintain catalyst activity. Particularly preferred are water concentrations of less than 10 p.p.m. Applicable alkylaromatic hydrocarbons include toluene, ortho-xylene, meta-xylene, para-xylene, ethylbenzene, polyethylbenzenes, ortho-ethyltoluene, meta-ethyltoluene, 1,2,3-trimethylbenzene, 1,2,4-trimethylbenzene, 1,3,5-trimethylbenzene, the normal propylbenzenes, the isopropylbenzenes, the butylbenzenes and higher molecular weight alkylaromatic hydrocarbons such as the alkylnaphthalenes. Particularly preferred, however, are the alkylaromatic hydrocarbons having 1 to 3 $C_1$ to $C_4$ alkyl groups. Also included within the scope of the present invention is the transalkylation of an alkylaromatic hydrocarbon and an alkylatable aromatic hydrocarbon. Thus, the transalkylation process of the present invention is not strictly limited to a disproportionation reaction. Applicable reactions thus include the transalkylation (disproportionation) of toluene to produce benzene and xylenes, the transalkylation of toluene with $C_9$ methyl aromatics to produce xylenes, or the transalkylation of benzene with polyethylbenzenes, such as diethylbenzene, and/or triethylbenzene to produce ethylbenzene.

The process of the present invention for transalkylating alkylaromatic hydrocarbons utilizing the hereinbefore set forth catalyst may be effected in any suitable manner known to those trained in the art including batch and continuous types of operation. A preferred method is a continuous type operation wherein the catalyst is contained in a reaction zone as a fixed bed and the alkylaromatic hydrocarbon is continuously charged to the reaction zone, which is maintained at the proper transalkylation conditions. The catalyst utilized in the process of the present invention is suitable for either gas phase or liquid phase reactions so that a liquid hourly space velocity (LHSV) in the reaction zone may be maintained in the range of about 0.1 to about 20 hours$^{-1}$ or more and, more preferably, from about 0.1 to about 10 hours$^{-1}$ or at a gaseous hourly space velocity in the range of about 100 to about 1500 hours$^{-1}$ or more. The reaction zone may also comprise an unpacked vessel or coil or may be lined with an absorbent packing material. When utilizing toluene as a reactant to form benzene and xylenes, a downflow, vapor phase operation is preferred; whereas in the transalkylation of benzene with polyethylbenzene(s) such as diethylbenzene and/or triethylbenzene, to form ethylbenzene, it is preferred to utilize upflow, liquid phase operations. Furthermore, the reactants may be comingled with an inert gas such as nitrogen, hydrogen, argon, methane, ethane, etc. In the particular preferred reaction comprising the transalkylation of benzene with a polyethylbenzene, it has been found that hydrogen, when present at a hydrogen to alkylaromatic mole ratio of about 2:1 to about 20:1, yields results superior to those obtained in the absence of hydrogen. In addition, it has been found that when the alkylaromatic is admixed with a halide in an amount of about 0.001 to about 2 wt. percent and particularly 0.001 to 0.5 wt. percent of the alkylaromatic feed, superior results are obtained, particularly in transalkylation reactions involving the formation of ethylbenzene. Applicable halides include fluorides, chlorides, bromides, and iodides with chlorides being preferred. The chloride may be added to the transalkylation reaction of the present invention by comingling and organic feed additive such as carbon tetrachloride or tertiary-butyl chloride with the alkylaromatic hydrocarbon charge stock or by adding the feed additive simultaneously but independently of the alkylaromatic charge.

The process of the present invention may also be effected in a moving bed type operation in which the alkylaromatic hydrocarbon (or mixture thereof) and the catalyst bed move either concurrently or countercurrently to each other while passing through the reaction zone.

Still another type of operation applicable is a batch type operation in which a quantity of the alkylaromatic hydrocarbon and the catalyst are placed in an appropriate apparatus such as a rotating or stirred autoclave. The autoclave is then heated to the desired temperature and maintained thereat for a predetermined residence time, at the end of which the contents are cooled and removed and the desired reaction product is recovered by conventional means such as washing, drying, fractional distillation, fractional crystallization, etc.

The process of the present invention can be more clearly understood by reference to the following examples, which are presented for the purpose of illustration only and with no intention of limiting the generally broad scope of the invention.

conventional silica/alumina H-mordenite catalyst (catalyst B) when utilized in a toluene transalkylation process. Each catalyst was utilized in 100 cc. amounts in the same pilot plant, which was of conventional design so as to eliminate any possible operating differences. In each test, the toluene was passed over the catalyst in a downflow, vapor phase operation. Constant reactor conditions of 500 p.s.i.g. pressure, 0.5 hr.$^{-1}$ weight hourly space velocity, 10:1 hydrogen to hydrocarbon mole ratio and 6 p.p.m. (weight) $H_2O$ in the toluene were maintained throughout each test. The temperature was varied between 300° C. and about 400° C. during the course of testing each catalyst. Each catalyst was treated in situ at 500° C. with hydrogen before the start of each test. The results obtained appear in Table I.

TABLE I

| Catalyst identity | A | B | A | B | A | B | A | B | A | B |
|---|---|---|---|---|---|---|---|---|---|---|
| Hours on stream | 8 | 9 | 48 | 51 | 95 | 93 | 125 | 123 | 173 | 171 |
| Reactor, temperature, ° C | 299 | 300 | 320 | 326 | 334 | 350 | 351 | 374 | 374 | 400 |
| Total product recovery, wt percent | 98.8 | 97.5 | 96.9 | 99.0 | 98.9 | 95.3 | 97.1 | 100.7 | 99.0 | 100.5 |
| Tolune conversion, wt. percent | 37.1 | 29.6 | 36.7 | 25.8 | 31.24 | 24.90 | 32.2 | 28.34 | 37.00 | 21.31 |
| Product analysis, wt. percent: | | | | | | | | | | |
| Nonaromatics: | | | | | | | | | | |
| Gas | .15 | .10 | .09 | .13 | .06 | | | 0.34 | 0.16 | 0.52 |
| Liquid | .90 | .90 | .60 | .40 | .50 | 0.40 | 0.20 | 0.60 | 0.40 | 0.70 |
| Benzene | 15.08 | 11.89 | 14.89 | 10.29 | 13.69 | 10.30 | 13.60 | 9.57 | 16.17 | 8.26 |
| Toluene | 62.91 | 71.43 | 63.34 | 74.20 | 68.76 | 75.10 | 67.80 | 71.06 | 63.00 | 78.69 |
| $C_8$ aromatics | 17.87 | 14.39 | 19.08 | 13.68 | 15.69 | 13.00 | 16.70 | 16.44 | 18.97 | 10.74 |
| $C_9+$ aromatics | 3.10 | 1.50 | 2.00 | 1.30 | 1.30 | 1.20 | 1.70 | 1.40 | 1.30 | 1.09 |

Example I

A mordenite type catalyst having a silica to alumina mole ratio greater than 15:1 was prepared by removing alumina from a mordenite having a conventional initial silica/alumina mole ratio of about 10:1 as originally prepared. The alumina deficient catalyst was prepared by removing $Al_2O_3$ by hydrochloric acid extraction from a hydrogen form of mordenite (H-mordenite) in 1/16" extrudate form obtained from the Norton Company. By X-ray analysis, the original extrudate contained about 69% by weight mordenite with the remainder being a silica matrix. The silica to alumina mole ratio of the total original composite was about 15.5:1, which corresponds to a silica to alumina ratio in the crystalline mordenite of about 10.7:1. The amount of hydrochloric acid present was maintained at a ratio of about 6 moles of hydrochloric acid per mole of alumina present in the original mordenite. The mordenite was contacted with the acid solution, prepared by mixing 1 volume of contrated HCl with 2 volumes of water, at reflux conditions including atmospheric pressure and a temperature of about 100° C. to about 110° C. The extraction was continued for 6 hours after which the acid extracted, alumina deficient mordenite was washed with water to remove excess chloride. The resulting washed mordenite was then calcined at a temperature of about 700° C. for a period of about 1 hour. An analysis of the silica to alumina mole ratio of the total composite after the completion of the acid extraction indicated a silica to alumina ratio of about 22:1 corresponding to a silica to alumina ratio in the crystalline mordenite of about 15.2:1. This alumina deficient, acid extracted mordenite was designated catalyst A, with the original high alumina content H-mordenite being designated catalyst B.

Example II

A direct comparison was made between the alumina deficient, acid extracted mordenite (catalyst A) and the Examination of the data presented in Table I conclusively shows that a mordenite catalyst having a portion of the alumina removed therefrom by acid extraction (catalyst A) is markedly higher in both activity and stability than the conventional hydrogen form of mordenite (H-mordenite, catalyst B) having a conventional silica to alumina ratio of about 10:1 as originally prepared. Thus, this direct comparison of the catalysts shows that a mordenite type catalyst having a silica to alumina ratio greater than 10:1 gives overall results definitely superior to those obtained with H-mordenite having a silica to alumina ratio of about 10:1.

Example III

The effect of the presence of water on the activity of an alumina deficient, acid extracted mordenite having a silica to alumina ratio in the mordenite of about 15:1, as prepared in Example I, and utilized for toluene transalkylation was studied at various water concentrations and temperatures. Constant reactor conditions of 500 p.s.i.g. pressure, 0.5 hr.$^{-1}$ weight hourly space velocity and a 10:1 hydrogen to hydrocarbon mole ratio were utilized. The results obtained are presented in Table II below.

TABLE II

| $H_2O$ concentration, p.p.m. weight | 6 | 15 | SAT. | 6 | 15 | SAT. | 6 | 15 | SAT |
|---|---|---|---|---|---|---|---|---|---|
| Temperature, ° C | 300 | 300 | 300 | 320 | 325 | 365 | 335 | 350 | 400 |
| Hours on stream | 18 | 18 | 18 | 51 | 51 | 51 | 78 | 78 | 78 |
| Toluene conversion, wt. percent | 30 | 21 | 11.5 | 35 | 26.5 | 16.5 | 38.5 | 34.5 | 22.5 |

Note.—SAT.=$H_2O$ saturated.

From the results presented in Table II, it is obvious that the presence of water during a toluene transalkylation reaction is highly deleterious when an alumina deficient, acid extracted mordenite catalyst is utilized therein. The magnitude of the effect of water on the activity of the caatalyst is quite unexpected. For example, when transalkylating toluene with a conventional alumina-rich H-mordenite catalyst (i.e., like catalyst B of Example I) at the same constant conditions utilized above, a temperature of 300° C. and at a time of about 18 hours, the toluene conversion at 6 p.p.m. water concentration was about 20 wt. percent. At saturated water conditions, the conversion declined to about only 17%, an overall relative percentage difference of about 15% in activity. In comparison thereto, the acid extracted, alumina deficient mordenite of the present invention showed a difference of over 60% in activity over the same time span.

Example IV

An acid extracted, alumina deficient mordenite catalyst like that prepared by the method of Example I is placed in a transalkylation reaction zone and a mixture of $C_9$ methyl-aromatic hydrocarbons and toluene with a trimethylbenzene to toluene mole ratio of 1:1, is charged to the reaction zone at transalkylation conditions including a temperature of about 460° C., a pressure of 300 p.s.i.g., a hydrogen to hydrocarbon mole ratio of about 10:1 and a weight hourly space velocity of 1.0 hr.$^{-1}$. Analysis of the reaction zone effluent shows that the product distribution is about 44 mole percent xylenes, about 30 mole percent trimethylbenzenes unconverted, about 21 mole percent toluene unconverted and about 5% benzene.

Example V

An acid-extracted, alumina deficient mordenite catalyst like that prepared by the method of Example I and reduced in situ with hydrogen at 500° C. was utilized in the transalkylation of a feed mixture comprising diethylbenzenes, triethylbenzenes, and benzene. The composition of the pre-dried feed stock, in weight percent, was as follows: light ends, trace; benzene, 57.2; ethylbenzene, 0.3; diethylbenzenes, 40.1; triethylbenzenes, 1.5; tetraethylbenzenes, 0.3; and $C_{16}$ to $C_{18}$ hydrocarbons, 0.6. The feed mixture was charged in an upflow, liquid phase operation at a temperature of 250° C., a pressure of 500 p.s.i.g., a liquid hourly space velocity of 1.0 and 0.25 cubic feet per hour of hydrogen. The product composition obtained, in weight percent, was as follows: light ends, trace; benzene, 51.5; ethylbenzene, 32.7; diethylbenzenes, 13.9; triethylbenzenes, 0.9; tetraethylbenzenes, 0.3; and $C_{16}$ to $C_{18}$ hydrocarbons, 0.7.

Example VI

In this example, acid extracted, alumina deficient mordenite catalyst prepared according to the method of Example I was utilized in the transalkylation of ethylbenzene. A pre-dried high quality ethylbenzene (99.9+% ethylbenzene, trace toluene) feed stock was charged in an upflow, liquid phase operation at transalkylation conditions, including a pressure of 500 p.s.i.g., a temperature of 250° C., a liquid hourly space velocity of 1.0 and 0.25 cubic feet per hour of hydrogen. Tertiary butyl-chloride was added to the feed to provide from about 300 to about 500 p.p.m. chloride during the run. A run of over 510 hour duration was achieved. The results obtained are presented in Table III.

TABLE III

| Time on stream (hr.) | 265 | 331 | 439 | 481 | 508 |
|---|---|---|---|---|---|
| Conversion, wt. percent | 45.6 | 45.1 | 43.0 | 41.4 | 38.9 |
| Product composition, wt. percent: | | | | | |
| Light ends | 0.1 | 0.1 | Trace | Trace | Trace |
| Benzene | 17.3 | 17.7 | 16.9 | 16.1 | 16.0 |
| Ethylbenzene | 54.4 | 54.9 | 57.0 | 58.6 | 60.1 |
| Diethylbenzenes | 27.6 | 26.7 | 25.6 | 24.8 | 23.3 |
| Triethylbenzenes | 0.2 | 0.2 | 0.2 | 0.2 | 0.1 |
| $C_{16}$-$C_{18}$ hydrocarbons | 0.3 | 0.4 | 0.3 | 0.3 | 0.5 |

As is apparent from the data in Table III, an extremely stable ethylbenzene transalkylation process was achieved with conversion dropping only about 5% over the last 250 hours of this run. Thus, an acid extracted, alumina deficient mordenite catalyst is extremely successful, since it has been shown to be stable and active over long periods of time for the transalkylation of toluene, as shown in the first examples above, and for ethylbenzene as shown in the latter examples.

I claim as my invention:

1. A process for transalkylating an aromatic hydrocarbon which comprises contacting said hydrocarbon, at transalkylation conditions, including a temperature of about 200° C. to about 480° C. and a pressure of about atmospheric to about 100 atmospheres, with a catalyst consisting essentially of a mordenite type catalyst composition having a silica to alumina mole ratio greater than about 10:1, said catalyst composition having been obtained by increasing the silica to alumina mole ratio of a mordenite having an initial silica to alumina mole ratio of about 10:1.

2. The process of claim 1 wherein said catalyst composition has a silica to alumina mole ratio of about 15:1 to about 100:1.

3. The process of claim 1 wherein said catalyst composition is prepared by extracting alumina from a mordenite having an initial silica to alumina mole ratio of about 10:1 by treatment with an aqueous solution of at least 1 N concentration of an acid at a temperature of about 0° C. to about 200° C.

4. The process of claim 3 wherein said acid is hydrochloric, sulfuric or nitric acid.

5. The process of claim 1 wherein said alkylaromatic is toluene.

6. The process of claim 5 wherein said transalkylation is effected by contacting the toluene with the catalyst in a downflow, vapor phase manner.

7. The process of claim 1 wherein said alkylaromatic is a mixture of a trimethylbenzene and toluene.

8. The process of claim 1 wherein said alkylaromatic is a mixture of a polyethylbenzene and benzene.

9. The process of claim 8 wherein said polyethylbenzene is a diethylbenzene or a triethylbenzene.

10. The process of claim 8 wherein said transalkylation is effected by contacting the mixture with the catalyst in an upflow, liquid phase manner.

11. The process of claim 1 wherein said alkylaromatic is admixed with hydrogen at a hydrogen to hydrocarbon mole ratio of about 2:1 to about 20:1.

12. The process of claim 1 wherein said alkylaromatic is admixed with halogen in an amount of about 0.001 to about 0.5 weight percent of the alkylaromatic feed.

13. The process of claim 12 wherein said halogen is chloride.

14. The process of claim 1 wherein said alkylaromatic is substantially anhydrous.

References Cited

UNITED STATES PATENTS

| 3,476,821 | 11/1969 | Brandenburg et al. | 260—672 T |
|---|---|---|---|
| 3,562,345 | 2/1971 | Mitsche | 260—672 T |
| 3,367,884 | 2/1968 | Reid | 252—455 Z |
| 3,436,174 | 4/1969 | Sand | 23—113 |
| 3,442,795 | 5/1969 | Kerr et al. | 208—120 |
| 3,480,539 | 11/1969 | Voorhies et al. | 208—111 |
| 3,551,510 | 12/1970 | Pollitzer et al. | 260—672 T |
| 3,578,723 | 5/1971 | Bowes et al. | 260—672 T |

CURTIS R. DAVIS, Primary Examiner